United States Patent
Chokshi et al.

(10) Patent No.: US 10,382,899 B2
(45) Date of Patent: *Aug. 13, 2019

(54) LOST DEVICE DETECTION USING GEOSPATIAL LOCATION DATA

(71) Applicant: Uber Technologies, Inc., San Francisco, CA (US)

(72) Inventors: Karna Chokshi, San Francisco, CA (US); Michael O'Herlihy, San Francisco, CA (US); Zach Singleton, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/107,832

(22) Filed: Aug. 21, 2018

(65) Prior Publication Data

US 2019/0090094 A1 Mar. 21, 2019

Related U.S. Application Data

(63) Continuation of application No. 15/706,576, filed on Sep. 15, 2017, now Pat. No. 10,085,121.

(51) Int. Cl.
*H04W 4/029* (2018.01)
*G08B 21/24* (2006.01)
(Continued)

(52) U.S. Cl.
CPC ........ *H04W 4/029* (2018.02); *G08B 21/0269* (2013.01); *G08B 21/0277* (2013.01);
(Continued)

(58) Field of Classification Search
CPC ..... H04W 4/029; H04W 4/028; H04W 4/021; H04W 4/023; G08B 21/22; G08B 21/24;
(Continued)

(56) References Cited

U.S. PATENT DOCUMENTS 8,773,275 B1  7/2014 Parenteau et al.
9,460,609 B2 * 10/2016 Lee .......................... G08B 21/24
(Continued)

OTHER PUBLICATIONS

PCT International Search Report and Written Opinion, PCT Application No. PCT/IB2018/056748, dated Dec. 23, 2018, 16 pages.
(Continued)

*Primary Examiner* — Magdi Elhag
(74) *Attorney, Agent, or Firm* — Fenwick & West LLP

(57) ABSTRACT

A network system detects lost client devices based on a comparison of geospatial locations transmitted by user and provider client devices during and after a service. The network system assigns a service status indicating that a service from a start location to a destination location is in progress and monitors the locations of the user and provider client devices during the duration of the service and for a specified period of time after the service ends. In response to determining that the user and provider client devices remain in proximity to each other after the service has ended, the network system notifies the user of the lost device.

20 Claims, 4 Drawing Sheets

(51) Int. Cl.
*G08B 21/02* (2006.01)
*H04W 4/02* (2018.01)
*H04W 4/42* (2018.01)

(52) U.S. Cl.
CPC ............ *G08B 21/24* (2013.01); *H04W 4/023* (2013.01); *H04W 4/42* (2018.02)

(58) Field of Classification Search
CPC ............ G08B 21/0277; G08B 13/2462; G08B 12/0269; G08B 21/0205; G08S 1/207; G01S 5/0027
See application file for complete search history.

(56) References Cited

U.S. PATENT DOCUMENTS

| | | |
|---|---|---|
| 9,504,004 B1 | 11/2016 | Auvenshine et al. |
| 9,522,651 B2 | 12/2016 | Tominaga |
| 10,085,121 B1* | 9/2018 | Chokshi ................ H04W 4/029 |
| 2011/0313804 A1 | 12/2011 | Camp et al. |
| 2015/0228000 A1 | 8/2015 | Bijor et al. |
| 2017/0231066 A1 | 8/2017 | Roberts et al. |
| 2017/0353833 A1 | 12/2017 | de Barros Chapiewski et al. |

OTHER PUBLICATIONS

United States Preinterview First Office Action, U.S. Appl. No. 15/706,576, dated Mar. 8, 2018, 22 pages.

\* cited by examiner

LOST DEVICE DETECTION USING GEOSPATIAL LOCATION DATA

CROSS REFERENCE TO RELATED APPLICATIONS

This application is a continuation of co-pending U.S. application Ser. No. 15/706,576, filed Sep. 15, 2017, which is incorporated by reference in its entirety.

TECHNICAL FIELD

The described subject matter generally relates to the field of network systems, and, more particularly, to identifying lost telecommunications devices by comparing the geospatial locations of user and provider client devices during and after a service.

BACKGROUND

Network systems provide support for the logistical issues in managing the transportation of persons, cargo, and the like. In some systems, a provider provides transportation services to a user to a location selected by the user. Sometimes, however, users inadvertently leave items (e.g., phones, wallets, keys, etc.) in a provider's vehicle after reaching their destination, which causes frustration to both the user and to the provider, who is tasked with holding on to the item until it can be returned. Users may have difficulty retrieving their lost items, particularly when the item is not noticed right away, and must rely on the provider to bring the item to a specific location. However, by the time the lost item is discovered, the user and the provider may be in different vicinities such that the provider must drive out of her way to return it. This may lead to inefficient use of resources as providers returning lost items are able to fulfill fewer service requests from other users.

SUMMARY

To enable a more efficient use of resources and return of lost items, a network system detects lost client devices by comparing the geospatial locations of user and provider client devices during and after a transport service (e.g., a trip).

In one embodiment, a network system, such as a transport arrangement system, receives, through a client application running on a user client device and operated by a user (e.g., a rider), input comprising a set of service data, including an origin location, a request for service (e.g., a transport service to transport the user) from the origin location, a service type, a destination location, and/or a desired departure time. The origin location can correspond to a location specified or selected by the user or detected by a location-aware resource of the user's client device (e.g., global positioning system (GPS) receiver or component), or can correspond to the location from which the service begins (e.g., a pickup location). In some examples, origin locations are stored in an origin location data store and include one or more pre-mapped locations.

The network system matches the user with an available provider based on information about the provider (e.g., current location and status) and/or information from the set of service data (e.g., origin location and/or destination location). Responsive to the provider vehicle arriving at the origin location, the network system assigns a service status indicating that the service has started (or is in progress) and monitor the locations of the user and provider client devices during the duration of the service. According to examples, the network system instructs the client devices to (and/or the client applications on the client devices are programmed to) begin transmitting their geospatial locations to the network system. The network system compares the transmitted geospatial location information to determine whether the client devices are in proximity to each other. Additionally or alternatively, the client devices transmit sensor data or telematics information (e.g., indications of current speed, acceleration/deceleration, events, stops, and so forth) that the device detection module can use to detect proximity. Alternatively, the network system can receive sensor data from the user client device and/or the provider client device to determine telematics information. In still other embodiments, the client devices can communicate with each other by at least one client device transmitting radio signals that are detected by the other client device. The network system receives data from the user client device and/or the provider client device, compares the received data associated with the client devices, and determines that the devices are in proximity to each other responsive to the received signal strength exceeding a threshold.

The client devices continue to transmit their geospatial location periodically during the duration of the service and for a specified period of time after the service ends. In one embodiment, the network system records or assigns a "service complete" status, in a record associated with the service, in response to user input through the provider client device. In another embodiment, a "service complete" status is assigned responsive to a location determination module on the provider client device transmitting a first location at the destination location (and optionally, sensor data or telematics information indicating that the provider client device is not moving) and a second location that is greater than a threshold distance away from the destination location. In still other embodiments, the network system assigns the "service complete" status responsive to input from the provider client device indicating a pressure change in the provider vehicle as a result of a vehicle door opening and/or closing.

The network system continues to monitor the geospatial locations of the user and provider client devices for a specified period of time (e.g., 30 seconds, 5 minutes, etc.) after the "service complete" status is assigned. Responsive to determining that the devices remain in proximity to each other after the specified/predetermined period of time has elapsed, the network system notifies the user and/or the provider of the lost client device. In one embodiment, the network system instructs the user client device and/or the provider client device to emit an audible noise (e.g., a high-pitched sound) and/or to vibrate to alert the user and/or the provider of the presence of the user client device. Additionally or alternatively, the network system sends a message to the provider through the provider application and/or notifies the user via a messaging application or a secondary means (e.g., via email and/or a second electronic device).

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
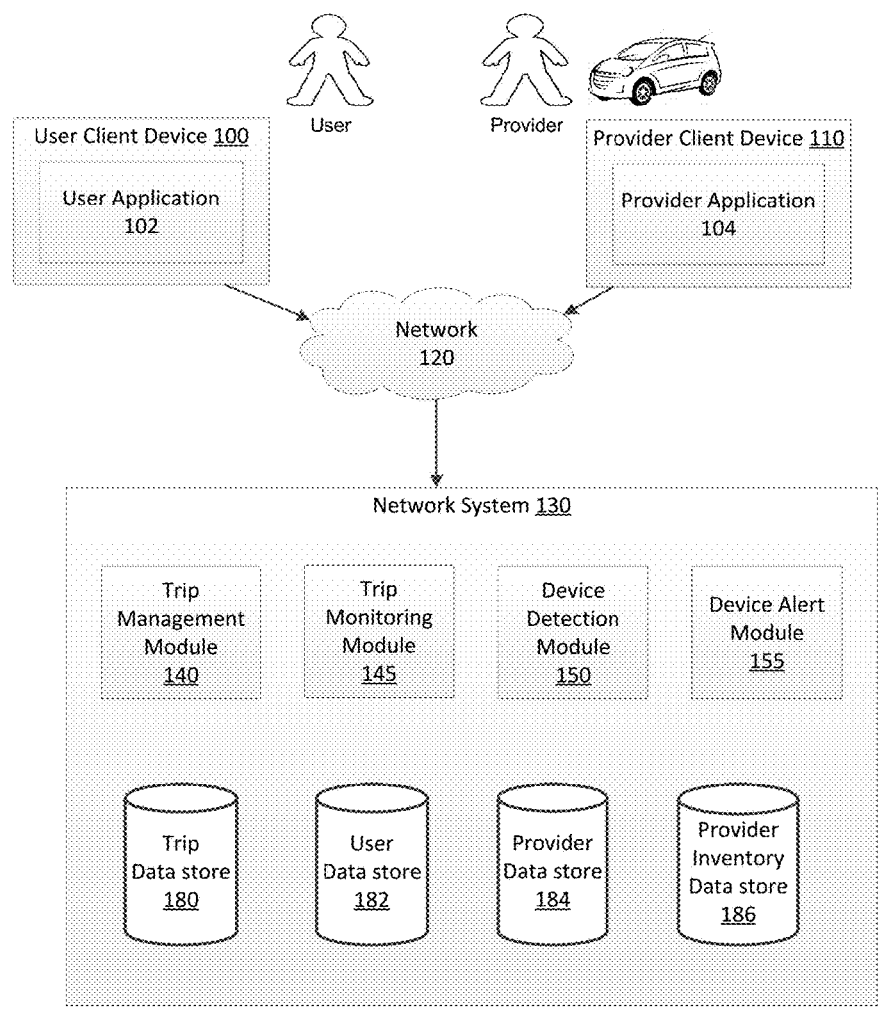
FIG. 1 illustrates the system environment for an example network system, in accordance with an embodiment.

Turning now to the specifics of the system architecture, FIG. 1 illustrates a system environment for an example network system 130. In the example of FIG. 1, the network system 130 coordinates the transportation of persons and/or goods/items for a user (e.g., such as a user) by a service provider (e.g., a provider of a vehicle). The provider uses a vehicle to provide the transportation to the user. In this example embodiment, the network system 130 includes a trip management module 140, a trip monitoring module 145, a device detection module 150, a device alert module 155, and various data stores including a trip data store 180, a user data store 182, a provider data store 184, and a provider inventory data store 186. These modules and data stores are not native components of a generic computer system, and provide structures and functions beyond generic functions of a computer system, as further described below.

A user operates a client device 100 that executes a user application 102 that communicates with the network system 130. The user operates the user application 102 to view information about the network service 130, and to make a request for service from the network system 130 for a delivery or transport service of the user (and, optionally, additional persons) and/or items, for example cargo needing transport. The user application 102 determines an origin location and/or a destination location, or enables the user to specify an origin location and/or a destination location associated with the service. An origin location and/or a destination location may be a location inputted by the user or may correspond to the current location of the user client device 100 as determined automatically by a location determination module (not shown) in the user client device 100, e.g., a global positioning system (GPS) component, a wireless networking system, or a combination thereof. For purposes of simplicity, as described herein, an origin location can correspond to a start location for service (i) determined by the user application 102 (e.g., based on the current location of the user client device 100 using a GPS component), (ii) specified or selected by the user, or (iii) determined by the network system 130.

According to examples herein, the user client device 100 can transmit a set of data (e.g., referred to herein as "service data") to the network system 130 over the network(s) 120 in response to user input or operation of the user application 102. Such service data can be indicative of the user's interest in potentially requesting service (e.g., before actually confirming or requesting the service). For example, the user may launch the user application 102 and specify an origin location and/or a destination location to view information about the network service before making a decision on whether to request service. The user may want to view information about the average or estimated time of arrival for pick up by a provider, the estimated time to the destination, the price, the available service types, etc. Depending on implementation, the service data can include the origin and/or destination location information, user information (e.g., identifier), application information (e.g., version number), device identifier or type, etc. According to some examples, each time the user modifies the origin and/or destination location, the user application 102 can generate and transmit the service data to the network system 130.

Once the user confirms or orders a service via the user application 102, the user application 102 can generate data corresponding to a request for the service through the network system 130 (e.g., also referred to herein as a "service request" or set of service data). In response to receiving the set of service data, in one example, the network system 130 determines the average ETA at the pickup location of providers whose current location is within a threshold distance of the pickup location (e.g., providers who are all within one mile of the pickup location). Depending on implementation, the set of service data can include user or device information (e.g., a user identifier, a device identifier), a service type (e.g., vehicle type) and/or selected service option (such as described herein), an origin location, a destination location, a payment profile identifier, a desired departure time, and/or other data. The network system 130 selects a provider from a set of providers, such as based on the provider's current location and status (e.g., offline, online, available, etc.) and/or information from the service data (e.g., service type, origin location, and/or destination location), to provide the service for the user and transport the user from the origin location to the destination location. In response to selecting an available provider, the network system 130 sends an invitation message to the provider client device 110 inviting the provider to fulfill the request for service.

The provider operates a client device 110 executing a provider application 104 that communicates with the network system 130 to provide information indicating whether the provider is available or unavailable to provide transportation services to users. The provider application 104 can also present information about the network service to the provider, such as invitations to provide service, navigation instructions, map data, etc. In one embodiment, the provider application 104 enables the provider to provide information regarding availability of the provider by logging into the network system 130 and activating a setting indicating that they are currently available to provide service. The provider application 104 also provides the current location of the provider or the provider client device 110 to the network system 130. Depending on implementation, the current location may be a location inputted by the provider or may correspond to the current location of the provider client device 110 as determined automatically by a location determination module (not shown) in the provider client device 110, e.g., a GPS component, a wireless networking system, or a combination thereof. The provider application 104 further allows a provider to receive, from the trip management module 140, an invitation message to provide a service for a requesting user, and if the provider accepts (e.g., via input), the provider application 104 can transmit an acceptance message to the trip management module 140. The trip management module 140 can subsequently provide information about the provider to the user application 102. As another embodiment, the provider application 104 can enable the provider to view a list of current requests for service and to select a particular request to fulfill. The provider application 104 can also receive routing information from the trip management module 140. The provider application 104 enables a provider to provide a rating for a user upon completion of a service. In one embodiment, the rating is provided on a scale of one to five, five being the maximal (best) rating.

The user client device 100 and provider client device 110 are portable electronic devices such as smartphones, tablet devices, wearable computing devices (e.g., smartwatches) or similar devices. Alternatively, the provider client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The user client device 100 and the provider client device 110 interact with the network system 130 through client applications configured to interact with the network system 130. The applications 102 and 104 of the user client device 100 and the provider client device 110, respectively, can present information received from the network system 130 on a user interface, such as a map of the geographic region, and the current location of the user client device 100 or the provider client device 110. The applications 102 and 104 running on the user client device 100 and the provider client device 110 can determine the current location of the device and provide the current location to the network system 130.

The trip management module 140 is configured as a communicative interface between the user application 102, the provider application 104, and the various modules and data stores in the network system 130, and is one means for performing this function. The trip management module 140 is configured to receive provider availability status information and current location information from the provider application 104 and update the provider inventory data store 186 with the availability status. The trip management module 140 is also configured to receive sets of service data from the user application 102 and creates a corresponding service record in the trip data store 180. According to an example, a service record corresponding to a set of service data can include or be associated with a service ID, a user ID, an origin location, a destination location, a service type, pricing information, and/or a status indicating that the corresponding service data has not been processed. According to one example, when a provider accepts the invitation message to provide service to the user, the service record can be updated with the provider's information as well as the provider's location and the time when the request for service was accepted. Similarly, location and time information about the service as well as the cost for the service can be associated with the service record.

In one embodiment, during the service, the trip monitoring module 145 receives information (e.g., periodically) from the provider application 104 indicating the location of the provider's vehicle and/or sensor data or telematics information (e.g., indications of current speed, acceleration/deceleration, events, stops, and so forth). Alternatively, the trip monitoring module 145 can receive sensor data from the provider client device 110 to determine the telematics information. The trip monitoring module 145 stores the information in the trip data store 180 and can associate the information with the service record.

The trip monitoring module 145 also assigns and stores a service status in the trip data store 180 indicating the current status of the service (e.g., service created, service assigned, service in progress, service complete). In one embodiment, the trip monitoring module 145 assigns a service status based on user input from the provider through the provider application 104. For example, when a provider picks up a user at a pickup location, the provider can provide input through the provider application 104 indicating that the user has entered the provider's vehicle and that the service has started. In a similar manner, when the provider reaches the destination location and the user exits the provider's vehicle, the provider can provide additional input indicating that the service is complete.

In another embodiment, the trip monitoring module 145 assigns a service status based on information received from the location determination module in the provider client device 110. The location determination module determines the current location of the provider client device 110 and transmits the current location to the trip monitoring module 145, which compares the current location to the pickup location and/or the destination location of a given service to determine the service status. For example, in response to determining that the current location of the provider client device 110 is within a threshold distance of the pickup location, the trip monitoring module 145 assigns a "service in progress" status to the service. In another example, the trip monitoring module 145 assigns a "service in progress" status in response to the location determination module transmitting a first location within a threshold distance of the pickup location and a second location between the first location and the destination location (i.e., indicating that the vehicle reached the pickup location and is moving in the direction of the destination location). Similarly, the trip monitoring module 145 assigns a "service complete" status in response to the location determination module transmitting a first location at the destination location (and, optionally, sensor data or telematics information indicating that the provider client device 110 is not moving) and a second location that is greater than a threshold distance from the destination location and/or is between the destination location and a pickup location associated with a second set of service data.

The trip monitoring module 145 queries the user through the user application 102 allowing the user to opt-in to location monitoring during the duration of a service and/or for a specified period of time after the service ends. Thus, in yet another example, if the user opts-in, the trip monitoring module 145 assigns a "service in progress" status in response to receiving sensor data or telematics information from the user client device 100 and the provider client device 110 indicating that the devices 100 and 110 are traveling at the same speed. Alternatively, the trip monitoring module 145 can receive sensor data from the devices 100 and 110 to determine telematics information.

In still other embodiments, the trip monitoring module 145 assigns a service status in response to information received from the device detection module 150. For example, if the device detection module 150 detects that the user client device 100 and the provider client device 110 are within a threshold distance of each other (as discussed below), the device detection module 150 can transmit the proximity to the trip monitoring module 145, which assigns a "service in progress" status to the service. In response to the device detection module 150 notifying the trip monitoring module 145 that the user client device 100 and the provider client device 110 are no longer within the threshold distance of each other, the trip monitoring module 145 assigns a "service complete" status. In other embodiments, the trip monitoring module 145 assigns a "service complete" status in response to user input or input from the provider client device 110 indicating a pressure change in the provider vehicle as a result of a vehicle door opening and/or closing.

The device detection module 150 monitors the locations of the user client device 100 and the provider client device 110 based on geospatial location information transmitted by the location determination modules on the client devices 100 and 110. Responsive to the trip monitoring module 145 assigning a "service in progress" status, the device detection module 150 instructs the client devices 100 and 110 to (and/or the client applications 102 and 104 on the client devices 100 and 110 are programmed to) begin periodically transmitting their geospatial locations to the network system 130. In one embodiment, the client devices 100 and 110 also transmit sensor data or telematics information (e.g., indications of current speed, acceleration/deceleration, events, stops, and so forth). The device detection module 150 then compares the geospatial location information (and optionally, the sensor data or telematics information) received from the client devices 100 and 110 to determine whether the devices 100 and 110 are in proximity of each other (e.g., are within a threshold distance of each other). For example, as an alternative to or addition to the geospatial location information, based on the telematics information for each client device 100 and 110, the device detection module 150 can determine a similarity score or probability score of the client devices 100 and 110 traveling in a similar fashion (e.g., in the same direction, at the same speed, having the same deceleration or stops at similar times, etc.). If the similarity score or probability score satisfies a predetermined threshold score, the device detection module 150 can make a determination that the client devices 100 and 110 are in the vehicle together.

In response to determining that the user client device 100 and the provider client device 110 are within a threshold distance of each other, the device detection module 150 transmits indication regarding the proximity of the devices to the trip monitoring module 145.

In another embodiment, in response to the trip monitoring module 145 assigning a "service in progress" status, the device detection module 150 instructs at least one client device to transmit data that is detected by the other device and transmitted to the device detection module 150. In one embodiment, the data includes radio signals such as Wi-Fi or Bluetooth signals. For example, the provider client device 110 can transmit a Bluetooth signal comprising a unique beacon ID. The user client device 100 detects the signal and transmits the beacon ID to the device detection module 150, which detects the beacon ID as associated with the provider client device 110 and determines that the user client device 100 and the provider client device 110 are in proximity of each other in response to the received signal strength (RSS) exceeding a signal strength threshold.

Additionally or alternatively, the user client device 100 and the provider client device 110 communicate through audible and/or inaudible sounds. For example, the user client device 100 might emit a sound that can be detected by the provider client device 110 (and, optionally, by the user and the provider). In response to detecting the sound associated with the user client device 100, the provider client device 110 transmits the detection to the device detection module 150, which determines that the user client device 100 and the provider client device 110 are in proximity of each other.

The user client device 100 and the provider client device 110 continue to transmit their geospatial locations periodically (e.g., every three seconds), or based on a specified transmission schedule, during the service and for a specified period of time after the trip monitoring module 145 marks the service as complete. The trip monitoring module 145 assigns a "service complete" status to the service, as discussed above, in response to user input through the provider client device 110 and/or based on information received from the location determination module and/or the device detection module 150. In one embodiment, the trip monitoring module 145 instructs the device alert module 155 to alert the user (by, for example, emitting an audible noise and/or vibrating, or transmitting a notification to the user's client device 100) when the vehicle is within a threshold distance of the destination location, stopped at the destination location, and/or when the trip monitoring module 145 marks the service as complete.

In some examples, after assigning a "service complete" status, the trip monitoring module 145 instructs the device detection module 150 to continue monitoring the user client device 100 and the provider client device 110 for a specified period of time (e.g., 30 seconds, 5 minutes, etc.) to determine whether the client devices 100 and 110 remain in proximity to each other after the service has ended. The continued monitoring of the client devices 100 and 110 can be performed in accordance with user-specified settings (e.g., permission for the network system 130 to track device location after the "service complete" status). In one embodiment, the device detection module 150 determines that the client devices 100 and 110 remain in proximity to each other based on a comparison of the geospatial location information transmitted by the devices 100 and 110. For example, if the device detection module 150 determines that the devices 100 and 110 are within a threshold distance of each other after the trip monitoring module 145 has marked the service as complete, the device detection module 150 determines that the devices remain in proximity to each other (i.e., that the user has left her client device 100 in the provider vehicle) and notifies the device alert module 155 of the proximity.

Additionally or alternatively, the device detection module 150 uses transmitted sensor data or telematics information to determine proximity. For example, if the sensor data or telematics information exceeds a similarity threshold (e.g., the device detection module 150 determines that the user client device 100 and the provider client device 110 are traveling at the same speed after the service is complete), the device detection module 150 determines that the devices 100 and 110 remain in proximity to each other.

In another embodiment, the device detection module 150 determines proximity based on the signal strength of the radio signals received by at least one of the devices 100 and 110, as discussed above. Responsive to determining that the RSS exceeds a signal strength threshold after the trip monitoring module 145 assigns a "service complete" status, the device detection module 150 determines that the devices are in proximity to each other.

In response to determining that the user client device 100 and the provider client device 110 remain in proximity to each other after the service has ended, the device detection module 150 notifies the device alert module 155 of the proximity and instructs the device alert module 155 to alert the user and/or the provider that the user client device 100 remains in the provider vehicle. In one embodiment, the device alert module 155 instructs the user client device 100 to emit an audible noise (e.g., a high-pitched sound) and/or to vibrate to alert the user and/or the provider to the presence of the user client device 100 in the provider's vehicle. Additionally or alternatively, the device alert module 155 sends a notification message to the provider client device 110 to notify the provider through the provider application 104.

In other embodiments, the device alert module 155 notifies the user of the user client device 100's presence in the provider's vehicle via a secondary means, such as via email and/or a second electronic device (e.g., work phone, tablet, etc.) on which the user application 102 is installed. In other embodiments, the device alert module 155 alerts the user through a short message service (SMS) message or a messaging application. The provider and the user can communicate through the provider application 104 and the user application 102 if the user application 102 is installed on a second electronic device associated with the user to coordinate the return of the user client device 100. If the user application 102 is not installed on a second electronic device associated with the user, the user can communicate with the network system 130 or the provider through a secondary means (e.g., via email).

The trip data store 180 maintains a record of each in-progress and/or each completed service coordinated by the network system 130. More specifically, each service provided by a provider to a user is characterized by a set of attributes (or variables), which together form a service record that is stored in the trip data store 180. The attributes describe aspects of the provider, the user, and the service. In one embodiment, each service record includes or is associated with a service identifier (ID), a user ID, a provider ID, the origin location, the destination location, the duration of the service, the service type, estimated time of pick up, actual time of pickup, and provider rating by user, user rating by provider, fare information, market information, and/or other environmental variables as described below. The variables for the service record are thus drawn from multiple sources, including the user's master and usage records in the user data store 182, the provider's master and operational records in the provider data store 184, and specific variables captured and received during each service.

The user data store 182 stores account information for each user who participates in the network system 130. For each user, the user data store 182 stores one or more database records associated with the user, including both master data and usage data. In some examples, the master data for a user includes or is associated with the user's name, cell phone number, payment information (e.g., credit card number), sign-up date, device type (e.g., type of cell phone), platform type (e.g., iOS, Android), application ID, and/or application version for the user application 102. In some embodiments, the master data for a user includes a unique beacon ID associated with the user client device 100. The usage data can correspond to historical information about the user's service experiences, such as the services received, canceled, and/or completed, such as the times, locations, and routes associated with such services.

The provider data store 184 stores account and operational information for each provider who participates in the network system 130. For each provider, the provider data store 184 stores one or more database records associated with the provider, including both master data and usage data. In some examples, master data for a provider includes or is associated with the provider's name, provider's license information, insurance information, vehicle information (year, make, model, vehicle ID, license plate), address information, cell phone number, payment information (e.g., credit card number), sign-up date, provider service type (regular, luxury, van, etc.), device type (e.g., type of cell phone), platform type (e.g., iOS, Android), application ID, and/or application version for the provider application 104. In some embodiments, the master data for a provider includes a unique beacon ID associated with the provider client device 110. The usage data can correspond to historical information about the provider's services received, provided, canceled, and/or completed, such as the times, locations, and routes traveled associated with such services.

The provider inventory data store 186 stores provider availability status information received from the trip management module 140, including whether the provider is available for matching and the location of the provider (which gets updated periodically). When the trip management module 140 receives a set of service data, the trip management module 140 determines, from the provider inventory data store 186, which providers are potential candidates to pick up the user for the newly created service. When the network system 130 marks a service record as complete, the network system 130 can add the provider back into the inventory of available providers in the provider inventory data store 186.

Figure 2:
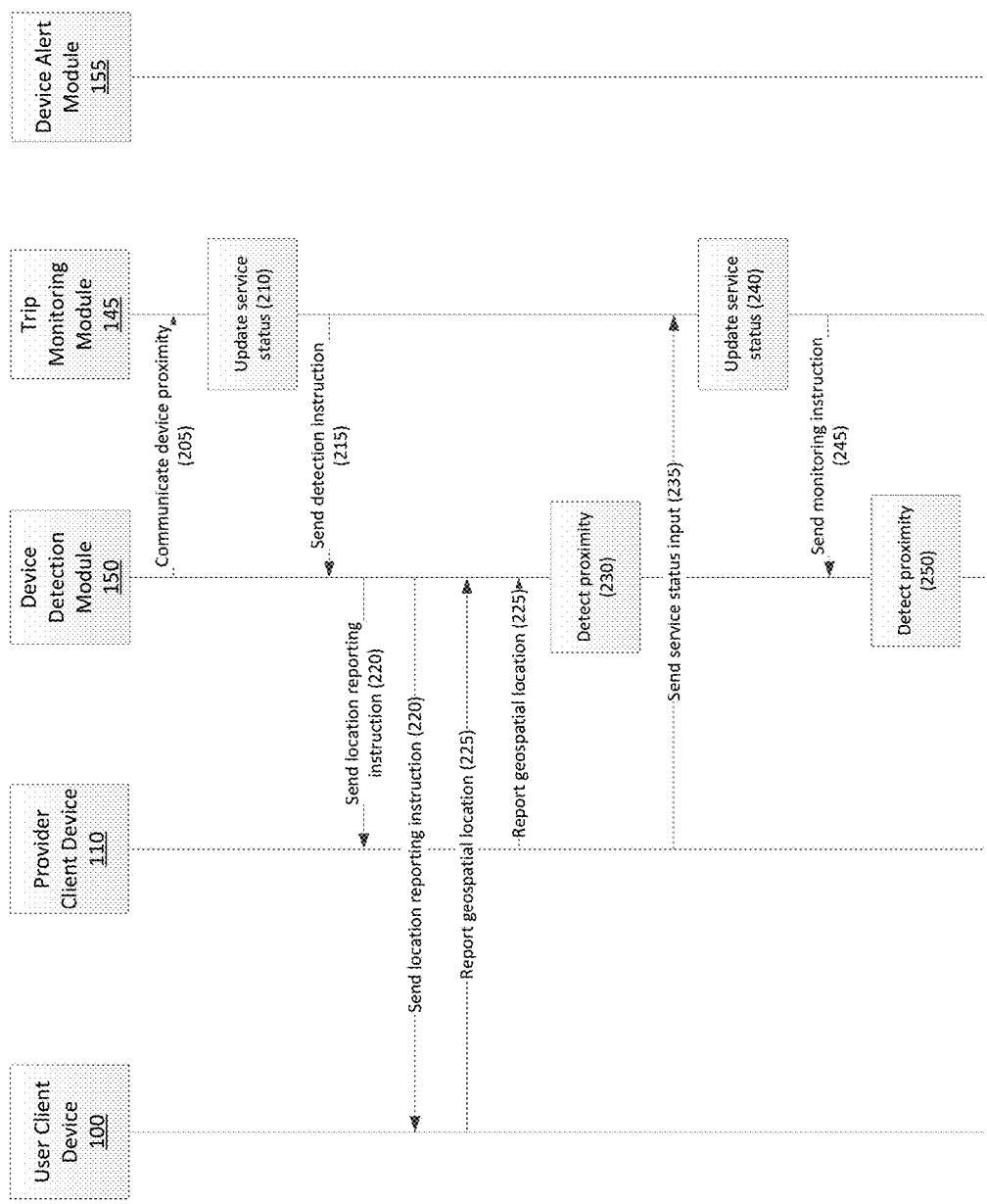
FIG. 2 is an interaction diagram for detecting a lost device using received radio signals, in accordance with an embodiment.

FIG. 2 illustrates an interaction diagram for detecting a lost telecommunications device using geospatial location data, in accordance with an embodiment. The device detection module 150 detects the proximity of a user client device 100 and a provider client device 110 associated with a service coordinated by the network system 130. In one embodiment, the device detection module 150 detects that the user client device 100 and the provider client device 110 are within a threshold distance of each other based on a comparison of the geospatial location information received from the client devices 100 and 110. In another embodiment, the device detection module 150 determines proximity based on a comparison of sensor data or telematics information received from the user application 102 and the provider application 104.

The device detection module 150 communicates 205 the detected proximity of the client devices 100 and 110 to the trip monitoring module 145, which updates 210 a service status in the trip data store 180. For example, in one embodiment, the trip monitoring module 145 updates the service status from "service assigned" to "service in progress" in response to the device detection module 150 notifying the trip monitoring module 145 of the proximity of the client devices 100 and 110. In other embodiments, the trip monitoring module 145 updates the service status based on user input from the provider through the provider application 104 and/or information received from the location determination module in the provider client device 110.

In response to updating the service status in the trip data store 180, the trip monitoring module 145 instructs 215 the device detection module 150 to continue monitoring the proximity of the client devices 100 and 110. The device detection module 150 then instructs 220 the client devices 100 and 110 to continue transmitting their geospatial location information during the duration of the service.

The client devices 100 and 110 each periodically transmit 225 the geospatial location information (and optionally, sensor data or telematics information) to the network system 130. The device detection module 250 then compares the geospatial location information and the sensor data or telematics information received from the client devices 100 and 110 to determine whether the devices 100 and 110 are within a threshold distance of each other. In response to determining that the distance between the devices is at or below the distance threshold, the device detection module 250 determines 230 that the devices are in proximity to each other.

In another embodiment, device detection module 250 monitors the proximity of the client devices 100 and 110 based on data transmitted by at least one of the devices, detected by the other, and transmitted to the network system 130. In one embodiment, the data includes radio signals such as Wi-Fi or Bluetooth signals. The device detection module 150 compares the received data with the beacon IDs associated with the client devices 100 and 110 and determines that the client devices 100 and 110 are in proximity to each other in response to the RSS exceeding a signal strength threshold. In other embodiments, the client devices 100 and 110 communicate through audible sounds transmitted to the device detection module 150.

The client devices 100 and 110 continue to periodically transmit their geospatial location to the network system 130 during the duration of the service and for a specified period of time after the trip monitoring module assigns a "service complete" status. In one embodiment, the provider provides input through the provider application 104 indicating that the service is complete. The provider client device 110 sends 235 the service status input to the trip monitoring module 145, which updates 240 the service status in the trip data store 180. In other embodiments, the trip monitoring module 145 assigns a "service complete" status based on information received from the location determination modules on the client devices 100 and 110, as discussed above with respect to FIG. 1. In still other embodiments, the trip monitoring module 145 updates the service status in response to the device detection module 150 detecting that the client devices 100 and 110 are no longer in proximity to each other (i.e., if the RSS is at or below a signal strength threshold).

The trip monitoring module 145 instructs 245 the device detection module 150 to continue monitoring the user client device 100 and the provider client device 110 for a specified period of time (e.g., 30 seconds, 5 minutes, etc.) to determine whether the client devices 100 and 110 remain in proximity of each other after the service has ended. In one embodiment, the device detection module 150 determines 250 that the client devices 100 and 110 remain in proximity to each other if the difference between the geospatial locations of the client devices 100 and 110 is at or below a distance threshold, as discussed above with respect to FIG. 1. In another embodiment, the device detection module 150 determines the continued proximity based on a comparison of the sensor data or telematics information transmitted by the client devices 100 and 110. For example, if the user client device 100 and provider client device 110 are traveling at the same speed at the trip monitoring module assigns a "service complete" status, the device detection module 150 determines that the devices remain in proximity to each other (i.e., that the user client device 100 remains in the provider's vehicle). In still other embodiments, proximity is detected if the RSS of the received radio signals exceeds a threshold. For example, if the RSS of the wireless signal associated with the provider client device 110 and detected by the user client device 100 remains the same after the trip monitoring module 145 has assigned a "service complete" status, the device detection module 150 determines that the devices remain in proximity to each other.

Figure 3:
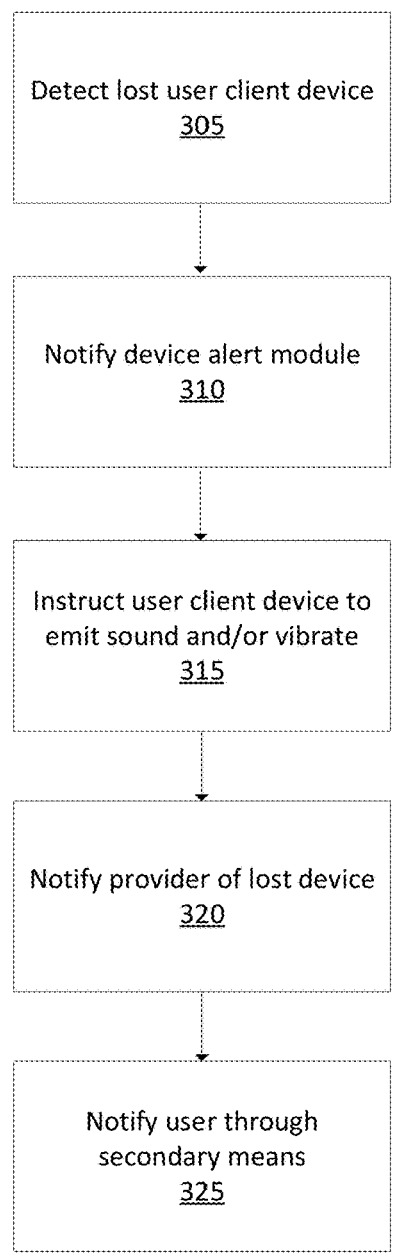
FIG. 3 is a flow chart for notifying users of a lost device, in accordance with an embodiment.

FIG. 3 is a flow chart for notifying users of a lost telecommunications device, in accordance with an embodiment. At 305, the device detection module 150 detects a lost user client device 100 based on continued proximity of the user client device 100 and the provider client device 110 after the trip management module 145 has assigned a "service complete" status, as discussed above with respect to FIG. 2. Responsive to determining that the user client device 100 and the provider client device 110 remain in proximity to each other after a specified/predetermined period of time has elapsed (i.e., that the user client device 100 remains in the provider vehicle after the service has ended), the device detection module 150 notifies 310 the device alert module 155 and instructs the device alert module 155 to notify the user and/or the provider of the lost device.

In one embodiment, the device alert module 155 instructs 315 the user client device 100 to emit an audible sound to alert the user and/or the provider to the presence of the user client device 100 in the provider vehicle. Additionally or alternatively, the device alert module 155 instructs the user client device 100 to emit a notification by, for example, vibrating and/or displaying a notification on the display of the user client device 100.

The user client device 100 emits the audible sound and/or the notification for a specified period of time (e.g., 10 seconds). If, after the specified/predetermined period of time has elapsed, the client devices 100 and 110 remain in proximity to each other, the device alert module 155 notifies 320 the provider client device 110 of the lost device through the provider application 104. In one embodiment, the notification includes visual and audible components. For example, the device alert module 320 instructs the provider client device 110 to display a notification message alerting the provider to the lost device and to emit an audible alert in conjunction with the notification message. In other embodiments, the device alert module 320 retrieves an email address associated with the provider from the provider data store 184 and notifies the provider via email.

At 325, the device alert module 155 notifies 325 the user associated with the user client device 100 of the lost device through secondary means. In one embodiment, the device alert module 155 sends a notification to a secondary client device associated with the user of the user client device 100. For example, the device alert module 155 might send the lost device notification to a user's work phone or tablet or other electronic device on which the user application 102 is installed. In other embodiments, the device alert module 155 retrieves an email address associated with the user from the user data store 182 and notifies the user via email and/or alerts the user through a SMS message or a messaging application (e.g., WhatsApp, Facebook Messenger).

Figure 4:
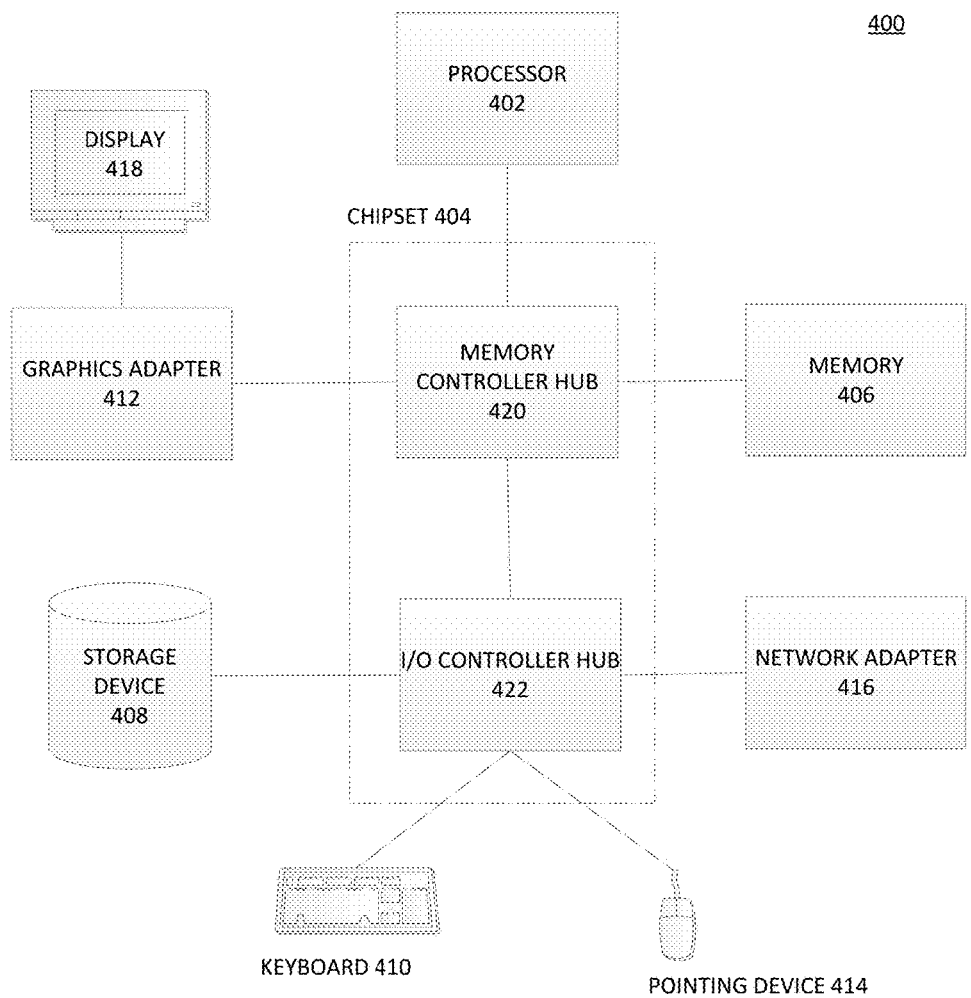
FIG. 4 illustrates example components of a computer used as part or all of the network system, the user client device, and/or the provider client device, in accordance with an embodiment.

FIG. 4 is a block diagram illustrating physical components of a computer 400 used as part or all of the network system 130, user client device 100, or provider client device 110 from FIG. 1, in accordance with an embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400, such as a host or smartphone, may lack a graphics adapter 412, and/or display 418, as well as a keyboard 410 or external pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The foregoing description described one embodiment of the invention in which the network system 130 identifies a user client device 100 left in a provider's vehicle after completion of a service. In other embodiments, the network system 130 can employ a similar method to identify keys, wallets, or other items associated with the user that are equipped with a radio-frequency identification (RFID) chip.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A method comprising:
while a transportation service is in progress, periodically receiving sensor data from a provider client device associated with a provider of the service and sensor data from a user client device associated with a user of the service;
receiving data from the provider client device that the transportation service is no longer being provided to the user;
responsive to receiving the data, comparing the received sensor data from the provider client device and the received sensor data from the user client device;
responsive to the compared sensor data from the devices exceeding a similarity threshold, transmitting an alert to a secondary client device associated with the user.

2. The method of claim 1, wherein the sensor data comprises data associated with a current speed of the respective client devices.

3. The method of claim 1, wherein the sensor data comprises data associated with an acceleration or deceleration of the respective client devices.

4. The method of claim 1, further comprising instructing the user client device to emit an audible noise or vibrate.

5. The method of claim 1, further comprising sending a notification for display on the provider client device.

6. The method of claim 1, wherein the data from the provider client device indicates a pressure change in a provider vehicle.

7. The method of claim 1, wherein the data from the provider client device comprises user input indicating that the trip is complete.

8. A non-transitory computer-readable storage medium storing computer-executable instructions that, in response to executing, cause a device comprising a processor to perform operations, comprising:
while a transportation service is in progress, periodically receiving sensor data from a provider client device associated with a provider of the service and sensor data from a user client device associated with a user of the service;
receiving data from the provider client device that the transportation service is no longer being provided to the user;
responsive to receiving the data, comparing the received sensor data from the provider client device and the received sensor data from the user client device;
responsive to the compared sensor data from the devices exceeding a similarity threshold, transmitting an alert to a secondary client device associated with the user.

9. The non-transitory computer-readable storage medium of claim 8, wherein the sensor data comprises data associated with a current speed of the respective client devices.

10. The non-transitory computer-readable storage medium of claim 8, wherein the sensor data comprises data associated with an acceleration or deceleration of the respective client devices.

11. The non-transitory computer-readable storage medium of claim 8, further comprising instructing the user client device to emit an audible noise or vibrate.

12. The non-transitory computer-readable storage medium of claim 8, further comprising sending a notification for display on the provider client device.

13. The non-transitory computer-readable storage medium of claim 8, wherein the data from the provider client device indicates a pressure change in a provider vehicle.

14. The non-transitory computer-readable storage medium of claim 8, wherein the data from the provider client device comprises user input indicating that the trip is complete.

15. A computer system, comprising:
one or more computer processors for executing computer program instructions; and a non-transitory computer-readable storage medium storing instructions executable by the one or more computer processors to perform steps comprising:
while a transportation service is in progress, periodically receiving sensor data from a provider client device associated with a provider of the service and sensor data from a user client device associated with a user of the service;
receiving data from the provider client device that the transportation service is no longer being provided to the user;
responsive to receiving the data, comparing the received sensor data from the provider client device and the received sensor data from the user client device;
responsive to the compared sensor data from the devices exceeding a similarity threshold, transmitting an alert to a secondary client device associated with the user.

16. The computer system of claim 15, wherein the sensor data comprises data associated with a current speed of the respective client devices.

17. The computer system of claim 15, wherein the sensor data comprises data associated with an acceleration or deceleration of the respective client devices.

18. The computer system of claim 15, further comprising instructing the user client device to emit an audible noise or vibrate.

19. The computer system of claim 15, further comprising sending a notification for display on the provider client device.

20. The computer system of claim 15, wherein the data from the provider client device indicates a pressure change in a provider vehicle.

* * * * *